Jan. 28, 1969    J. C. WOODFORD    3,424,189
SELF-DRAINING SILL COCK AND VACUUM BREAKER
Filed Aug. 17, 1965    Sheet 3 of 3
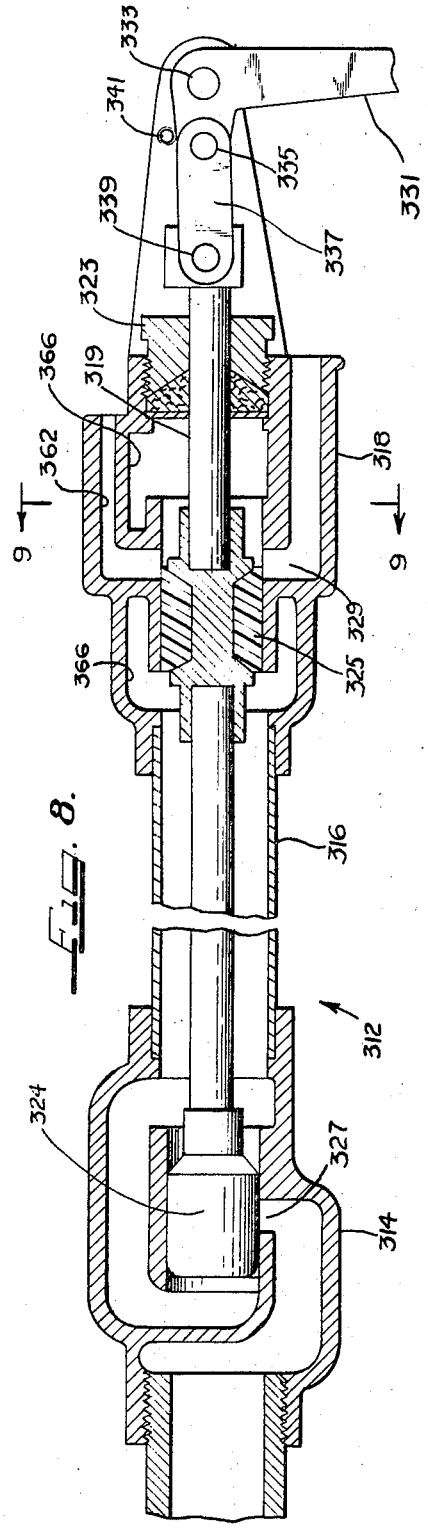
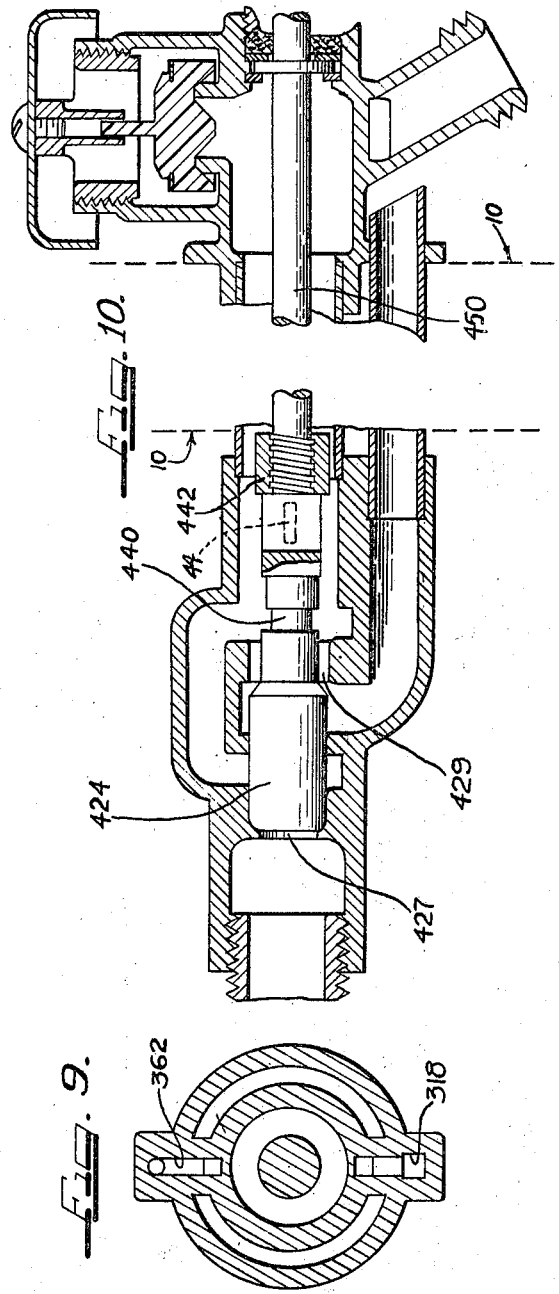
INVENTOR
JOSEPH C. WOODFORD
BY Petherbridge, O'Neill & Aubel
Attys.

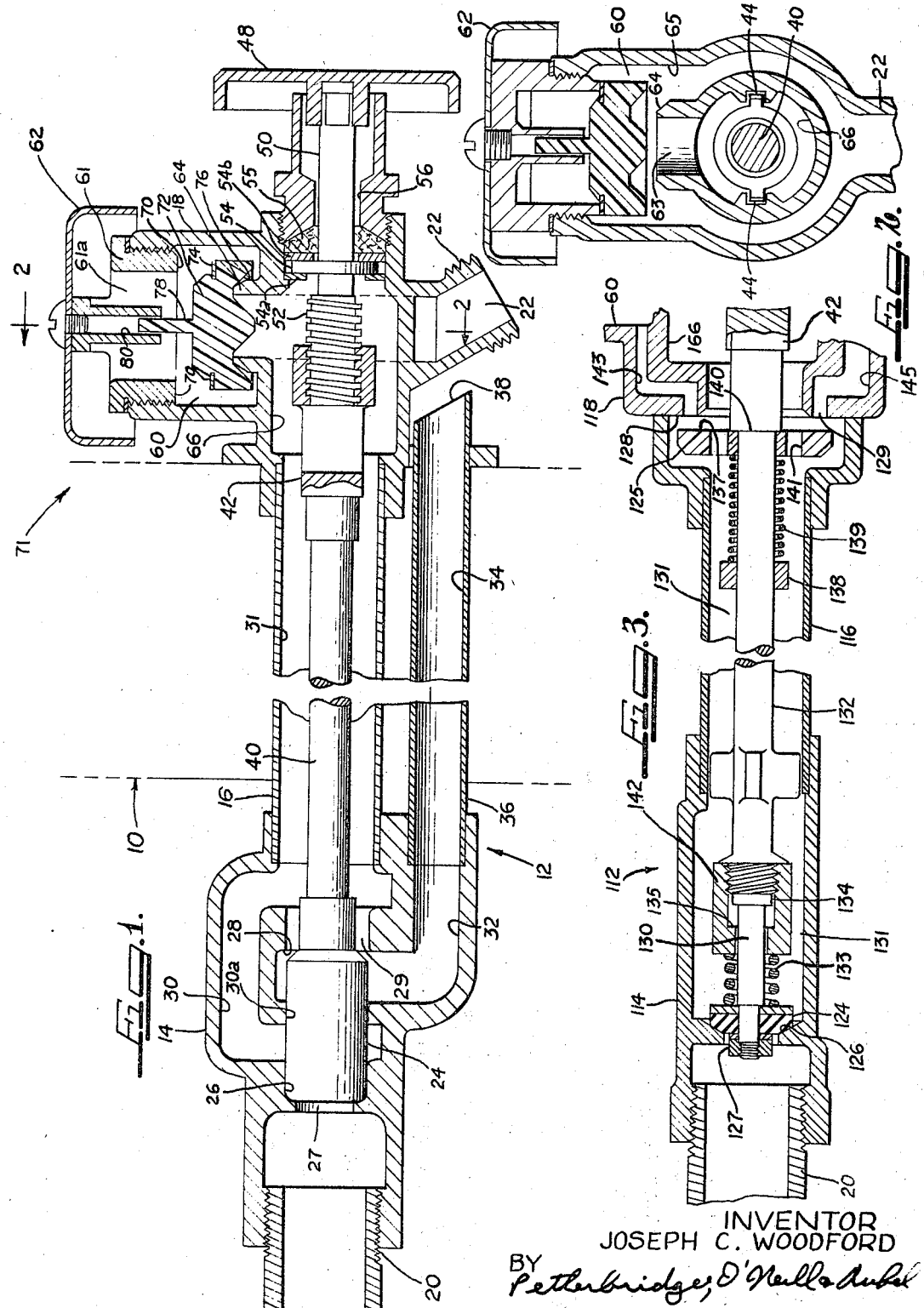

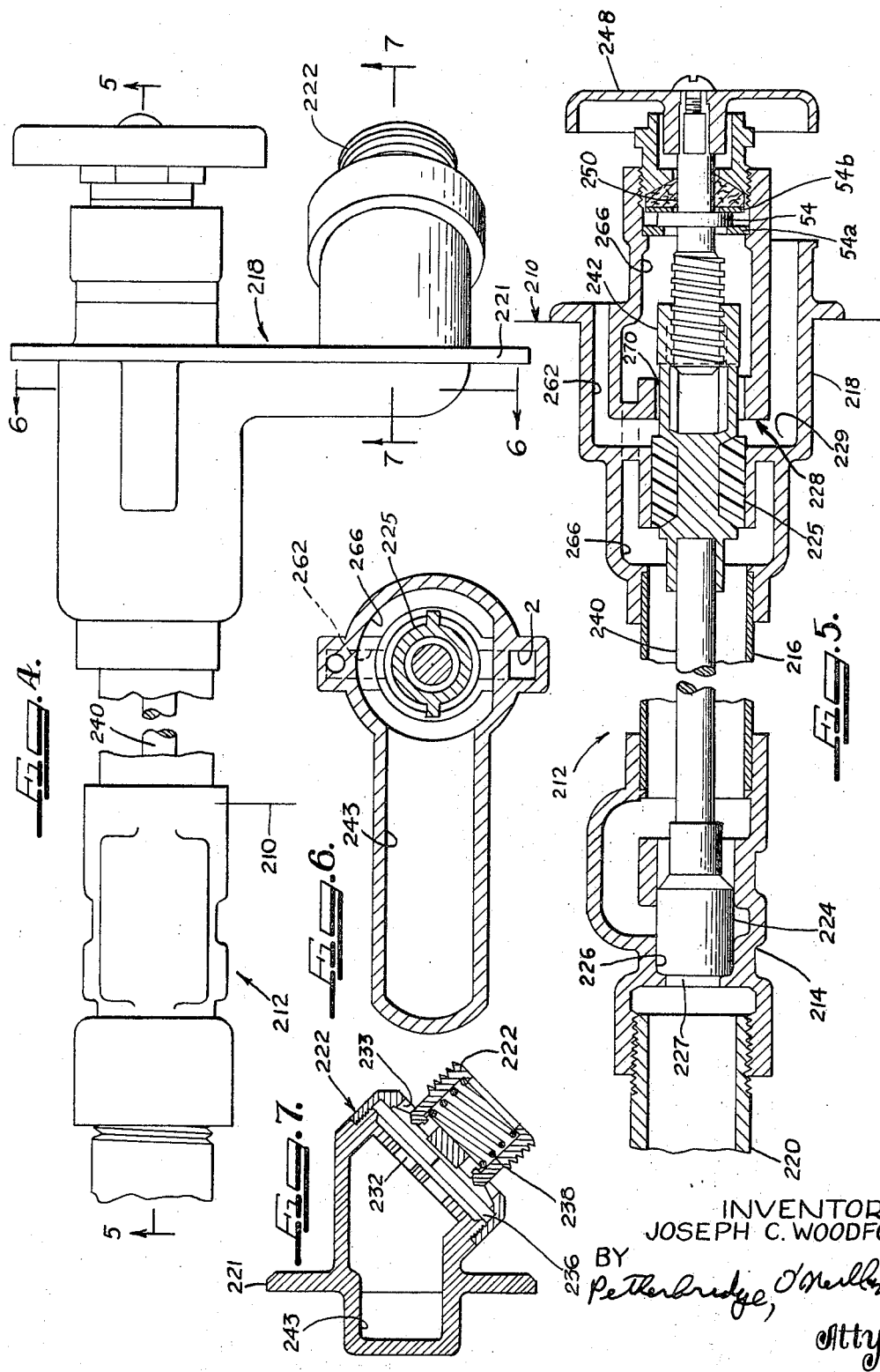

# United States Patent Office 3,424,189
Patented Jan. 28, 1969

3,424,189
SELF-DRAINING SILL COCK AND VACUUM BREAKER
Joseph C. Woodford, Spring Lake, Mich., assignor to Woodford Manufacturing Company, Des Moines, Iowa, a corporation of Iowa
Filed Aug. 17, 1965, Ser. No. 480,366
U.S. Cl. 137—218      3 Claims
Int. Cl. E03c *1/10;* E03b *9/08;* F16k *11/00*

ABSTRACT OF THE DISCLOSURE

A self-draining sill cock assembly for use in fluid supply systems and which is constructed to automatically drain the sill cock assembly between the outlet and the valve inlet portions thereof when fluid flow through the assembly is stopped by the closure of the valved inlet.

---

This invention relates to wall hydrant or faucet assemblies, such as sill cocks, for controlling liquid flow through such faucets which are intended to extend through an enclosure wall from a fluid inlet connection located inside of the wall to an outlet connection located outside of the wall, and is more particularly directed to such a faucet assembly which is self-draining under "shut off" conditions of the faucet, and, further, which may prevent back-siphoning of liquid into the faucet.

In such applications of faucets which are subject to low temperature, water trapped in the faucet may freeze and block flow through the faucet, and, in some cases, may even cause damage to the faucet parts.

Moreover, faucets of the kind used for sill cocks exterior of buildings are usually provided with a connection having standard hose-coupling threads to receive commercially available hose couplings. Back-siphoning of liquid into the faucet can occur, if the outlet end of a coupled hose is left in a vessel or gutter containing liquid, and, if for some reason the pressure in the faucet water supply line drops sufficiently to cause vacuum conditions and attendant back-siphonage of the liquid through the hose into the faucet and the supply piping. Inasmuch as such liquids may be contaminated, it is imperative for such applications that means be provided to prevent back-siphoning of the contaminated liquid into the water supply system.

With the present invention, the aforementioned difficulties and problems of the prior art, among others, are substantially overcome by a faucet valve assembly having a simple valve structure which eliminates not only the problem of freezing of water trapped in the faucet, but also eliminates back-siphoning of water into the faucet and the effects thereof.

Faucet assemblies constructed in accordance with the principles of the present invention are particularly adapted to receive an antisiphon fitting of the kind now known in the trade as a vacuum breaker which is designed to prevent back-siphoning of liquid from a hose through the faucet into the water supply system.

It is, therefore, an object of the present invention to provide new and improved self-draining, antifreeze faucet assemblies and the like.

Another object of the present invention is to provide new and improved self-draining, antifreeze valve assemblies for faucets.

Still another object of the present invention is to provide new and improved self-draining, antifreeze faucet assemblies including a valve assembly of simple and compact construction.

A further object of the present invention is to provide new and improved self-draining, antifreeze faucet assemblies, which are further adapted to receive an antisiphon vacuum breaker.

Another object of the present invention is to provide new and improved faucet assemblies which are usable under substantially all temperature and pressure conditions normally encountered in the use of such faucets.

Still another object of the present invention is to provide new and improved antifreeze faucet assemblies, such as sill cocks, especially adapted for horizontal disposition in a wall or the like.

A further object of the present invention is to provide a faucet valving assembly which automatically drains water from the faucet when the faucet is closed.

A still further object, in keeping with the preceding object, is to provide a faucet which, in addition, prevents backsiphoning of water through the valve when the inlet pressure is low.

Another object of the present invention is to provide new and improved valve means for a faucet which automatically drain the faucet when the valve means is closed.

Another object of the present invention is to provide new and improved valve means for faucets and the like adapted for horizontal installation in a wall and which is economical to fabricate, easy to install, and reliable in operation.

These and other objects, features and advantages of the present invention will become more fully apparent from a careful consideration of the following detailed description, when read in conjunction with the accompanying drawings illustrating general embodiments of the present invention and wherein:

FIG. 1 is an elevational view, shown in longitudinal section, of a first embodiment of the subject invention;

FIG. 2 is a sectional view, as seen generally from line 2—2 of FIG. 1, except showing the same in a different operating condition;

FIG. 3 is a longitudinal sectional view, similar to a part of FIG. 1, of a second embodiment of the subject invention;

FIG. 4 is a top plan view of a third embodiment of the subject invention;

FIGS. 5, 6 and 7 are sectional views, as seen respectively, from lines 5—5, 6—6, and 7—7 of FIG. 4;

FIG. 8 is a longitudinal sectional view of still a fourth embodiment of the subject invention;

FIG. 9 is a sectional view as taken generally from line 9—9 of FIG. 8; and

FIG. 10 is a longitudinal section of a fifth embodiment of the subject invention.

Referring now to FIGS. 1 and 2, there is shown, in section, a vertical wall 10 through which extends a hydrant or faucet assembly 12 constructed in accordance with the principles of the present invention. The faucet assembly 12 includes an inlet housing section 14 shown located inside of the wall 10. The section 14 is connected to a pair of wall tube housing sections 16 and 36 which both extend through the wall 10. Connected to the wall tubes 16 and 36 is a sill cock or outlet housing section 18. The section 18 is shown located outside of the wall 10, as viewed in FIG. 1.

The inlet section 14 of the assembly 12 includes an inlet pipe 20 which is adapted to be connected to a source of water and, accordingly, forms the inlet flow passage of the faucet inlet housing section 12. The sill cock housing section 18 forms the outlet flow passage of the assembly 12, and, as shown in FIG. 1, includes a discharge outlet 22 which may be threaded for connection to a hose or the like.

Axially disposed and supported within the faucet assembly 12 is a primary valve head member 24 which is constructed preferably of molded rubber and which is selectively and alternatively movable between spaced valve seats 26 and 28 which are formed internally in the housing. The valve head member 24 is movable to engage the seat 26 to close an internal passageway or port 27 which communicates the inlet 20 with an internal chamber 30. The valve head member 24 is movable to engage the seat 28 to close a passage or port 29 communicating the chamber 30 with a self-draining chamber 32 of an antifreeze drain tube arrangement to be described hereinafter in detail.

It is noted that, when the valve head member 24 is seated against the seat 26, as shown in FIG. 1, to close the inlet port 27, the valve member is moved from engagement with the seat 28 to permit thereby flow of fluid from the chamber 30 to the antifreeze drainage tube chamber 32. It is also noted that, when the valve head member 24 is fully seated against the seat 28 to block flow through passage or port 29, the valve head member 24 is removed from engagement with the valve seat 26 to permit thereby flow through the passage 27 into the chamber 30. A feature of the present invention disclosed in this embodiment resides in the provision of a single valve head member 24 for closing selectively and alternatively either the port 27 before the port 29 is opened or closing the port 29 before the port 27 is opened, and, for this purpose the distance between the seats 26 and 28 and the size of the valve head member 24 is determined relative to the seating area of the valve head member 24 so that, under no operating conditions, are both seats opened.

With the port 27 opened and the valve head member 24 closing port 28, water flows from the source through inlet pipe 20, through the port 27, through the internal flow chamber 30 and through an internal flow chamber 31 formed by the wall tube 16. From the chamber 31 the water flows into an outlet chamber 66 located in the outlet section 18, and, from this chamber, the water flows through the outlet 22 which is shown threaded to receive a hose and the like. With the port 27 opened, the valve head member 24 is seated against the valve seat 28 to prevent flow through the port 29 into the self-draining passage 32.

When it is desired to "shut off" the faucet, the valve head 24 is seated against the valve seat 26 to close the port 27. After the port 27 is closed, the port 29 is opened and water in the chambers 30, 31 and 66 will flow through the port 29, into chamber 32, from the chamber 32 into a chamber 34 formed in the second wall tube to the drain outlet 38.

Thus, with the present invention, a self-draining, antifreeze faucet is provided by the construction of a novel valve and chamber arrangement. This arrangement results in a freezeless type, self-draining faucet construction because the faucet internal chambers will all be substantially empty, except when the valve member 24 is unseated from seat 26 and water is flowing through the port 27.

To enhance self-draining of fluid through the outlet 28, it is preferable that the drain port 29 be located at or near the lowest point of the housing chambers, and it will be appreciated that a feature of this invention resides in the location of the drain outlet 38 of the drain assembly in a position located outside of the wall 10.

To actuate movement of the valve head member 24 between the seats 26 and 28, valve actuator means including a valve stem 40, yoke 42, handle stem 50 and grip wheel 48 are employed. The wheel 48 is keyed or otherwise secured to the handle stem 50 which in turn is in threaded engagement at its inner end 52 with complementary threads of the yoke 42. The yoke 42 is connected to the elongated valve stem 40, and the yoke 42 is held non-rotatably but axially movable within the faucet 12 by cooperating lug and keyway arrangements 44 (FIG. 2). The valve stem 40 fixedly carries the valve head 24 which is guided on bearing seal surfaces 30a, as shown in FIG. 1. A water-tight seal is maintained between the head 24 and surface 30a to prevent leakage into passage 32 from inlet 26 when inlet 26 is opened. A flange 54 carried by the handle stem 50 is employed which cooperates with retaining rings 54a and 54b to prevent axial movement of the stem 50 while permitting rotation thereof. A packing gland 55, and a bushing 56 are provided for the handle stem 50 to minimize fluid leakage along the stem 50.

Rotation of the wheel 48 and handle stem 50 will move the yoke 42 which, in turn, will move the valve head member 24 axially in the housing for engagement selectively and alternatively with either of the seats 26 and 28 thereby to open and close the ports 27 and 29 selectively to permit flow through the outlet 22 or drain outlet 38.

Preferably the faucet 12 is provided with a vacuum breaker, of conventional construction, which is generally indicated in FIG. 1 by the numeral 71. The vacuum breaker 71 is threadedly connected to a boss on the sill cock housing section 18. The vacuum breaker 71 includes a housing 61 which defines an internal chamber 61a which is in communication with a chamber 60 defined by the boss of the sill cock housing section 18. The vacuum breaker housing 61 has a central cylindrical portion 80 to which is threaded a vented cap 62. The cap 62 is maintained in spaced relation to the outlet of the chamber 61a to provide fluid communication chambers 61a and 60 with atmosphere as indicated by the arrowed line.

Carried in the bore of the cylindrical portion 80 is a guide post 78 of a movable check valve member 72 which is normally seated by gravity on a valve seat 64 when fluid is not flowing between the inlet 20 and the outlet 22. For this purpose, the check valve member 72 has an inwardly tapered valve shoulder 76 which is engageable with the valve seat 64 provided by the sill cock housing section 18.

In operation, when wheel 48 and stem 40 are actuated to unseat the valve head member 24 from the seat 26 to open the inlet port 27 so that water flows from the inlet 20 via chambers 30 and 31 to the sill cock chamber 66 and outlet 22, the water pressure, acting against the check valve member 72 of the vacuum breaker which is normally gravity closed and seated on seat 64, increases and (FIG. 6) lifts the check valve member 72 from the seat 64 to permit water to flow from the chamber 66 to chamber 60. The check member 72, when being unseated, is forced vertically upwardly by the pressure of the water passing through chamber 66 for engagement of a valve head 74 carried thereby with a valve seat 70 carried by the cylinder 61 of the vacuum breaker 71. When the check valve member 72 engages the upper seat 70, the member 72 closes the chamber 60 from communication with chamber 61a and the atmosphere, whereby the water flowing through the faucet chamber 66 is directed only through the outlet 22.

When the valve member 24 (FIG. 1) is moved to close position against the seat 26 and/or when the fluid pressure within the chamber 66 is reduced for any reason, such as failure in the water supply pressure, gravity forces will cause the valve member 72 to drop to 64 and move valve head 74 away from valve seat 70, and under such circumstances the ambient atmosphere is thereby in open communication with the outlet 22 through the chamber 65, 60 and 61a to preclude back-siphonage of liquid through outlet 22.

Shortly after the valve member 24 closes the inlet passage or port 27, the drain passage or port 29 is opened to permit water collected in the chambers of the housing of the faucet 12 to drain therefrom through the secondary wall tube 36 and drain outlet 38. Since the valve housing is thus drained, the water remaining in the housing, if any, will not freeze to an extent sufficient to block flow of fluid through these chambers or expand to break parts of the faucet. To improve drainage, the wall tube 36 may be inclined slightly relative to the horizon and drain opening port 29 is preferably located at the lowermost point relative to the chambers 30 and 31.

In FIG. 3 is illustrated a second embodiment of a hydrant or faucet constructed in accordance with the present invention. The hydrant or faucet 112 includes a fluid inlet housing 114, a wall tube 116 and an outlet housing 118 (shown broken away in FIG. 3) which sections are similar to the corresponding housing sections 14, 16 and 18 of the embodiment of FIG. 1.

To control flow of fluid through the faucet 112, two spring-biased, spaced valve head members 124 and 125 are employed. The valve head member 124 corresponds to the primary valve head member 24 of FIG. 1 and the valve head member 125 corresponds to the drain valve head portion of member 24 of FIG. 1. These valve head members 124 and 125 are seatable respectively on spaced valve seats 126 and 128 respectively which are formed integral with the faucet housing sections. The spaced valve head members 124 and 125 function as a flow control device for selectively and alternatively controlling flow of fluid through an inlet passage 127 and a drain passage 129. The valve head members 124 and 125 are spaced to operate so that one of the valves closes the corresponding passage before the other valve opens the corresponding passage and vice versa.

The valve head member 124 is normally closed and is secured to a guide stem 130 which is slideably movable in a yoke 142 shown in section in FIG. 3. A coil compression spring 133, bottomed at one end against the valve head member 124 and at its opposite end against the stem guide yoke 142, surrounds the guide stem 132 to bias the valve head member 124 to the left, as viewed in FIG. 3 against the valve seat 126 to block fluid flow through the port 127. Movement of the valve stem 132 to the right, as viewed in FIG. 3, permits the spring 133 to expand until such time as operation of the stem 52 (not shown) in the yoke 42 causes the shoulder 135 of the yoke 142 to engage the stem head 134 and the valve stem 132 whereupon continued subsequent threading of the yoke 42 moves the valve head member 124 from the seat 126 to open the primary inlet passage 127 and permit flow of fluid into the chamber 131 and out of the outlet 22 (not shown).

The drain control valve head member 125 is shown in disc form and as having an annular seating surface 137. The member 125 is mounted for axial movement relative to the stem 132. A stop 138 is formed on the valve stem 132 and a coil compression spring 139 is disposed between the stop 138 and the member 125 to bias the member 125 against a shoulder 140 carried by the valve stem 132. When the valve stem 132 is moved to the right, as viewed in FIG. 3, by rotation of the wheel 48 (not shown) and threading of the threads 52 (not shown) in the yoke 42, the member 125 engages the seat 128. Continued subsequent rightward movement of the stem 132 separates the valve 125 from contact with a shoulder 140 of the stem 132. However, the bias of the compression spring 139 holds the member 125 against the seat 128. Continued rightward movement of the valve stem 132 causes movement of the valve member 124, as was mentioned above from the seat 126, to open the inlet passage 127.

The valve head member 125 has central openings 141 therein to permit direct through-flow of water to the sill cock chamber 166 which is in fluid communication with the outlet 22 (not shown).

The sill cock section 118 includes an air vent passage 143 which is in open communication with atmosphere and which communicates with the chamber 131 at the valve seat 128. In an almost diametric relationship to vent passage 143, a drain passage 145 is disposed to extend from a radially spaced passage 129 located at the seat 128 which is also vented to atmosphere at a location generally located below the outlet 22 (not shown). When the drain valve member 125 is in the position shown in FIG. 3, liquid in the chambers 166 and 131 can drain from communicating drain passages 129 and 145 and air can enter the housing from atmosphere through passages 143 and 128 to prevent vacuum conditions being created in the housing of the faucet. A particular advantage of the embodiment shown in FIG. 3 is that the drain passage 145 is located in close proximity to the housing chamber 166 for quick draining of the faucet.

A further embodiment of the present invention is illustrated in FIGS. 4, 5, 6 and 7. Referring particularly to FIG. 5, a hydrant or faucet 212 is illustrated as including an inlet housing section 214 and an outlet sill cock housing section 218 connected in fluid communication by a wall tube 216. The inlet housing 214 communicates with a primary inlet pipe 220 and the outlet sill cock housing 218 communicates with an outlet 222.

The valving means arrangement for selectively and alternatively controlling fluid flow through the outlet 222 and the drain outlet 229 is disclosed in a slightly modified form from the valve arrangements previously described and is shown as including two spaced valve head members 224 and 225. The valve member 224 corresponds to the valve head member 24 of the embodiment of FIG. 1, whereas the valve head member 225 corresponds to the drain valve head portion of member 24 of the embodiment of FIG. 1. The valve head member 224 cooperates with a valve seat 226 for controlling flow of fluid through the primary flow passage 227 and the valve head member 225 cooperates with a valve seat 228 to control flow of fluid through a drain passage 229. In this embodiment of the present invention, both valve head members 224 and 225 are fixedly secured to a yoke 242 which in turn is threaded to a handle stem 250 which is shown connected to the wheel 248.

The sill cock housing 218 is slightly modified in this embodiment so that it fits in part within the wall 210 to a point where a flange 221 abuts the wall 210. The outlet 222 is shown offset from the axis of the handle stem 250 and is inclined downwardly thereof at an angle of approximately 45 degrees relative to the horizontal as viewed in FIG. 7. Offset chamber 243 (FIG. 6) communicates a sill cock chamber 266 with the outlet 222.

The drain valve head member 225 cooperates with the valve seat 228 to simultaneously open the air vent passage 262 and the drain passage 229 for permitting drainage of fluid from the sill cock chamber 266, when the valve member 224 is seated on its valve seat 226. Thus, with the valve head member 225 in the position shown in FIG. 5, the offset chamber 243 communicates with the chamber 266 through a passage 270 to provide a drain path out of the housing for the liquid inside the housing, and the vent passage 262 provides for air relief of the chamber 266.

Means for preventing back flow of liquid from the outlet 222 into the chamber 266 may be provided and may take the form of such means as disclosed in my Patent No. 3,023,767. As illustrated in FIG. 7, such back flow preventing (or antisiphoning means) may include spaced passages 232 and 233 which are closed separately by a flexible closure member 236 such as a slit diaphragm. The diaphragm 236 is biased by a spring 238 to close the primary flow passage 232. This bias may be overcome by pressure of water leaving the faucet through outlet 222 to move the diaphragm 236 to open the primary flow passage 232 and close the air vents 233. The operation of the faucet 212 of this embodiment is similar to that set forth above regarding the embodiment of FIGS. 1 and 2, except that use of the spring biased closure 236 provides a backsiphonage assembly which may be operably positioned at any angle and not merely in a vertical position, if desired.

FIGS. 8 and 9 illustrates a quick-opening and quick-closing type of valve assembly constructed in accordance with the present invention having many of the operating features and characteristics set forth above in connection with the previously described embodiments. In these figures, the hydrant or faucet unit 312 includes an inlet housing section 314 and an outlet sill cock housing section 318 connected by a wall tube 316. An inlet passage 327 opens to the side of the valve member 324 to give a balanced type valve arrangement. The remainder of the faucet unit 312 is similar to that previously described in connection with the embodiment of FIGS. 4–7 with the exception of structure and operation of the actuating means employed for operation of the valves controlling flow through the primary flow passage and the drain flow passage 329. In this embodiment, the hand wheel 248 of FIG. 5 is replaced by a toggle mechanism to provide quick opening and closing of the valve assembly. This embodiment is particularly useful for industrial applications in which time is weighed in dollars, and the particular valve in question is to be used either fully open or fully closed.

The toggle mechanism includes a stem 319 reciprocally supported by a bushing 323 in the sill cock housing section 318. The stem 319 is connected at its inner end to the valve member 325 controlling flow through a drain passage 329 and an air vent passage 362. The valve head member 325 is connected by a stem 340 to the valve head member 324. A bell crank lever 331 is pivoted on a post 333 and has a pivot pin 335 offset from pivot post 333. A link 337 is shown as connected between the pin 335 and the pin 339 on the end of the stem 319 so that rotation of the lever causes an axial movement of the stem 319. A stop 341 supported by the sill cock housing section 318 adjacent the pivot connection pin 335 limits the "over-center" movement of the toggle mechanism to slightly beyond a plane between the pivot connection posts 333 and 339. A partial turn of the lever 331 in a counterclockwise direction, as viewed in FIG. 8, thus fully opens the inlet passage 327 and closes the drain passage 329 and the vent passage 362 to communicate the sill cock chamber 366 with the outlet 322 (not shown) substantially in accordance with the operation of the arrangement shown in FIG. 1. By the arrangement of valves 324 and 325, one of the valves is opened only after the other valve closes and vice versa.

FIG. 10 illustrates a still further embodiment of the present invention which is also somewhat similar to the embodiment of FIGS. 1 and 2, with the exception that the yoke 442 is located on the inside of the wall 10 so that the yoke parts are exposed to the warmer temperatures inside of the wall to thereby reduce the possibility of the freezing of water in the screw threads. Compared to the embodiment of FIG. 1, the valve stem 440 of the embodiment of FIG. 10 which is connected to the valve member 424 is relatively shorter and the handle stem 450 is relatively longer than the corresponding parts of the embodiment of FIG. 1. The yoke 442 is supported nonrotatably, as in the embodiment of FIGS. 1 and 2, so that rotation of the handle stem 450 axially moves the valve member 424 to open the inlet passage 427 and close the drain passage 429 and vice versa. A hand wheel (not shown) may be used in this embodiment to rotate the handle stem 450 in a manner similar to the operation of the wheel 48 and stem 25 of the embodiment of FIG. 1.

Although various modifications and alterations of the present invention will become readily apparent to those versed in the art, it should be understood that what is intended to be embodied within the scope of the patent warranted hereon are all such embodiments as reasonably and properly come within the scope of the contribution to the art hereby made.

I claim:

1. A self-draining sill cock assembly, comprising a housing having a fluid outlet means formed for disposition on an exterior wall, the fluid outlet means being connected in fluid communication by first conduit means to a fluid flow inlet means spaced remotely from the fluid outlet means for disposition adjacent an interior wall, selectively operable valve means disposed adjacent the fluid inlet means of the housing and remote from the fluid outlet means thereof to alternately open and close the inlet means to alternately permit and prevent fluid flow from the inlet means through the first conduit means to the outlet means of the assembly, manually operable valve control means disposed in separated and spaced relationship with respect to the outlet means of the housing for disposition on an exterior wall, the valve control means being operably connected to the selectively operable remote valve means to provide the selective manual operation of the valve means from an exterior wall remote from the valve means separating the outlet and the inlet means of the assembly, fluid drain means selectively connectable in fluid communication with the first conduit means to permit fluid to be drained sequentially and automatically from the assembly when fluid flow from the inlet means is stopped by the selectively controlled valve closure of the fluid inlet means, the fluid drain means including second conduit means connected adjacent to the bottom portion of the first conduit means of the sill cock assembly and in fluid communication therewith, the second conduit means extending separately from the normal path of fluid flow through the first conduit means, the second conduit means extending in generally parallel relationship with the direction of fluid flow through the first conduit means, the second conduit means having discharge means disposed separately from the fluid outlet means and generally adjacent thereto for the discharge of drain fluid therefrom and on the same exterior wall as the fluid outlet means of the sill cock assembly, and manually operable valve control means being connected to the selectively operable valve means to close the fluid drain means and to open the fluid inlet means to fluid flow and to alternately open the fluid drain means and to close the fluid inlet means.

2. A self-draining sill cock assembly, comprising a housing having a fluid outlet means formed for disposition on an exterior wall, the fluid outlet means being connected in fluid communication by first conduit means to a fluid flow inlet means remotely disposed with respect to the fluid outlet means for disposition adjacent an interior wall, selectively operable valve means disposed adjacent the fluid inlet means of the housing and remote from the fluid outlet thereof to alternately prevent and permit fluid flow from the inlet means into the first conduit means and through the outlet means, manually operable valve control means disposed in separated and spaced relationship with respect to the outlet means of the housing for disposition on an exterior wall and operably connected to the selectively operable remote valve means to provide the selective manual operation of the valve means from an exterior wall separating the outlet and the inlet means, fluid drain means selectively connectable in fluid communication with the first conduit means to permit fluid to be drained sequentially and automatically from the assembly when fluid flow therethrough is stopped by the selectively controlled valve closure of the fluid inlet means, the fluid drain means including second conduit means connected adjacent to the bottom portion of the first conduit means or the sill cock assembly and in fluid communication therewith, the second conduit means extending separately from the normal path of fluid flow through the first conduit means, the second conduit means extending in generally parallel relationship with the direction of fluid flow through the first conduit means, the second conduit means having discharge means disposed separately from the fluid outlet means and adjacent thereto for the discharge of drain fluid therefrom and on the same exterior wall as the fluid outlet means, the manually operable valve control means being connected to the selectively operable valve means to close the fluid drain means and to open the fluid inlet means to fluid flow and to alternately open the fluid drain means and to close the fluid inlet means, and vacuum breaker means connected to the outlet means of the sill cock assembly and being disposed in separated relationship with respect to the discharge means of the fluid drain means.

3. The self-draining sill cock assembly of claim 2 wherein fluid backflow preventing means are connected across the fluid flow passage adjacent the vacuum breaker means to prevent the return of fluid through the outlet means and to the first conduit means of the sill cock assembly.

References Cited

UNITED STATES PATENTS

| | | | |
|---|---|---|---|
| 210,394 | 12/1878 | Apel | 137—302 X |
| 1,049,792 | 1/1913 | Woods | 137—625.27 X |
| 1,501,799 | 7/1924 | Neumeyer | 137—302 X |
| 2,649,768 | 8/1953 | Anderson | 137—304 |
| 2,927,598 | 3/1960 | Thompson | 137—218 |
| 2,997,054 | 8/1961 | Woodford | 137—218 |
| 3,106,935 | 10/1963 | Gatzke | 137—218 |
| 3,180,352 | 4/1965 | Kersten et al. | 137—218 |
| 3,244,192 | 4/1966 | Noland | 137—302 |

WILLIAM F. O'DEA, *Primary Examiner.*

DENNIS H. LAMBERT, *Assistant Examiner.*

U.S. Cl. X.R.

137—302, 625.27; 251—339

Disclaimer 3,424,189.—*Joseph C. Woodford*, Spring Lake, Mich. SELF-DRAINING SILL COCK AND VACUUM BREAKER. Patent dated Jan. 28, 1969. Disclaimer filed Apr. 16, 1980, by the assignee, *Woodford Manufacturing Company*.

Hereby enters this disclaimer to claims 1 and 2 of said patent.

[*Official Gazette, June 17, 1980.*]